United States Patent [19]
Fang

[11] Patent Number: 5,381,318
[45] Date of Patent: Jan. 10, 1995

[54] PORTABLE LIGHT GENERATING BELT DEVICE

[76] Inventor: Chung-Ho Fang, No. 41, Hsin-Le Rd., Tainan City, Prov. of China

[21] Appl. No.: 233,868

[22] Filed: Apr. 26, 1994

[51] Int. Cl.$^6$ .......................... F21L 15/08; G01B 3/10
[52] U.S. Cl. ..................... 362/108; 362/103; 362/253; 33/760; 33/767; 33/770
[58] Field of Search ................. 362/84, 103, 108, 253; 33/757, 758, 759, 760, 767, 768, 769, 770, 771; 242/379, 385.4

[56] References Cited

U.S. PATENT DOCUMENTS

| | | | |
|---|---|---|---|
| 3,153,745 | 10/1964 | Gurian et al. | 362/84 |
| 3,812,588 | 5/1974 | Bennett | 33/767 |
| 4,194,703 | 3/1980 | Roe | 33/767 |
| 4,516,325 | 5/1985 | Cohen et al. | 33/760 |
| 4,580,347 | 4/1986 | McKnight | 33/760 |
| 4,895,110 | 1/1990 | LoCascio | 362/108 |
| 5,245,516 | 9/1993 | De Haas et al. | 362/84 |

*Primary Examiner*—Ira S. Lazarus
*Assistant Examiner*—Y. Quach
*Attorney, Agent, or Firm*—Townsend and Townsend Khourie and Crew

[57] ABSTRACT

A portable light generating belt device includes a housing having an aperture, a fixed shaft, and a retaining unit disposed on an outer surface of the housing. A pulley includes a pulley body which is disposed rotatably on the shaft of the housing, an annular groove which is formed in an outer surface thereof, and a cavity which is formed in a side wall of the pulley body. A torsion spring is received within the cavity of the pulley body and is secured at one end portion thereof to the shaft of the housing and at the other end portion to the pulley body. A light generating belt is provided with an electroluminescent strip which can be powered to generate light, and has an inner end portion which is secured to the pulley and an outer end portion which extends through the aperture of the housing. An enlarged end of the belt is located outside of the housing and is sized so that the enlarged end cannot pass through the aperture into the housing. The enlarge end can be retained on the retaining unit of the housing when moved away from the aperture of the housing in the case where the device is in use. A battery operated power supply unit can be actuated so as to supply electrical current to the electroluminescent strip, thus lighting the same.

4 Claims, 3 Drawing Sheets

PORTABLE LIGHT GENERATING BELT DEVICE

BACKGROUND OF THE INVENTION

1. Field of the invention

This invention relates to a portable light generating belt device which can generate light under poor light conditions so as to enable a user to attract car driver's attention without the need for bringing a lamp with him in order to protect the user from being struck accidentally by the car, and more particularly to a light generating belt device which is provided with an electroluminescent strip that is connected electrically to a power supply unit so that the light generating belt device can be powered to generate light.

2. Description of the Related Art

Normally, a reflecting tape is put on one's person in order to attract the attention of a car driver and minimize the risk of being struck accidentally by the car. However, the reflecting tape can generate light only when a light source is directed thereto. Thus, the use of the reflecting tape is limited under dim light conditions.

SUMMARY OF THE INVENTION

Therefore, the main objective of this invention is to provide a portable light generating belt device which can replace the conventional reflecting tape and which is to be used during dark and foggy conditions.

According to this invention, a portable light generating belt device includes a housing having an aperture formed through the wall of the housing, a shaft fixed in the housing, and a retaining unit disposed on the outer surface of the housing. A pulley includes a pulley body which is disposed rotatably on the shaft of the housing, an annular groove formed in the outer surface or the pulley body, and a cavity which is formed in a side wall of the pulley body. A torsion spring is received within the cavity of the pulley body and is secured at one end portion thereof to the shaft of the housing and at the other end portion thereof to the pulley body. A light generating belt is wound on the pulley and is provided with an electroluminescent strip which can be powered to generate light. The light generating belt has an inner end portion which is secured to the pulley, and an outer end portion which extends through the aperture of the housing and which has an enlarged end located outside the housing and sized so that the enlarged end of the belt cannot pass through the aperture into the housing. The enlarged end of the belt can be retained on the retaining unit of the housing when moved away from the aperture of the housing in a case where the the device is in use. The spring biases the pulley to rotate in a direction so as to wind the belt on the pulley. A battery operated power supply unit is mounted in the housing and is connected electrically to the electroluminescent strip. The power supply unit can be actuated so as to supply electrical current to the electroluminescent strip, thus lighting the latter. Accordingly, when the device is in use, in a situation where a portion of the belt is extracted from the housing by pulling the same, when the pull on the belt is released, the extracted portion of the belt can be biased by the spring so as to retract into the housing except for the enlarged end of the belt. A slide slot is formed through the wall of the housing near the aperture. A gripping member is disposed slidably in the slide slot and can be actuated to slide toward the aperture along the slide slot in order to press the belt against the pulley, thus preventing rotation of the pulley in the housing. Preferably, a retaining clip is disposed detachably on the outer surface of the housing so as to fasten the housing to a waist belt of a user.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENT

Figure 1:
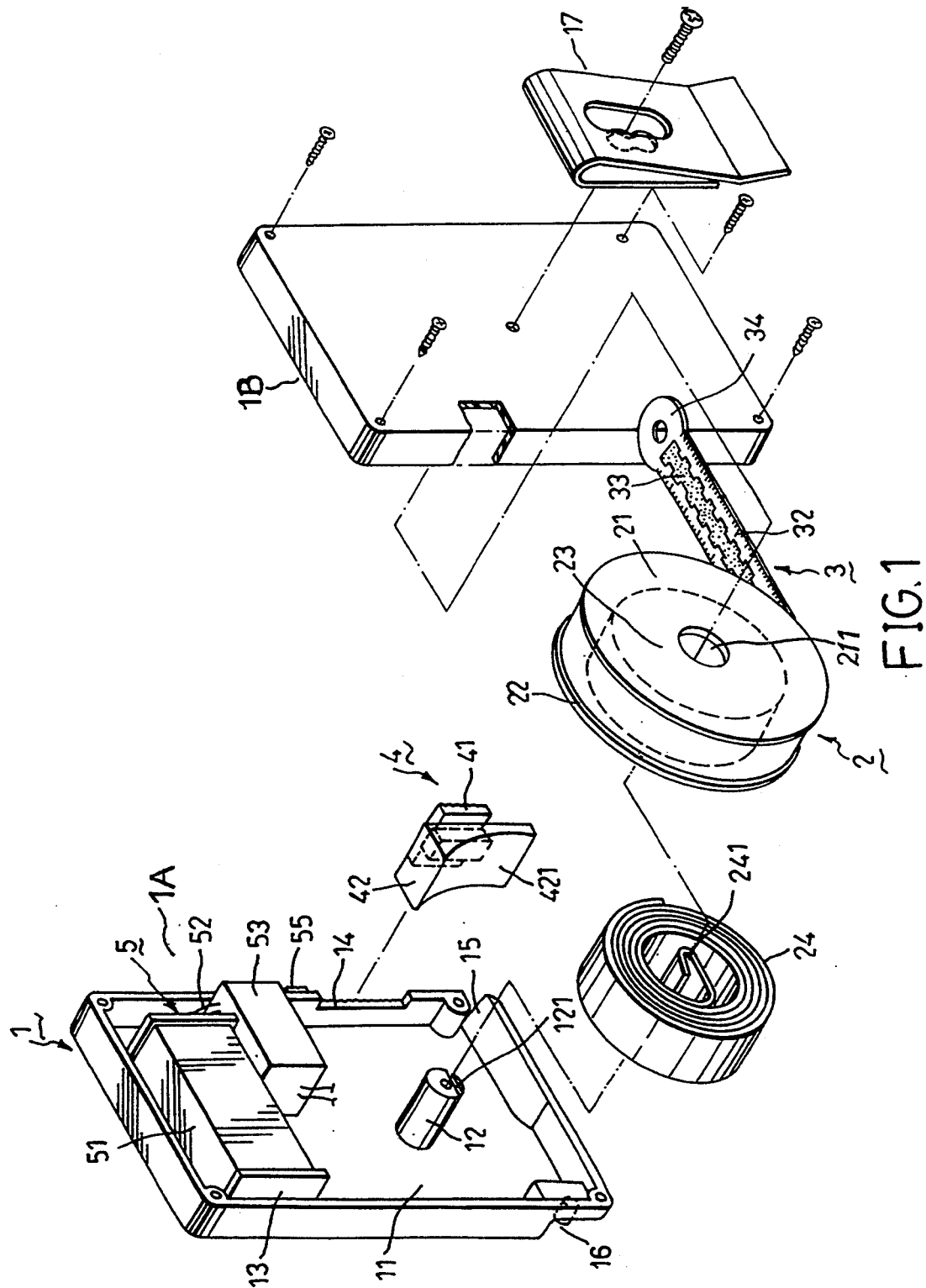
FIG. 1 is an exploded view of a portable light generating belt device according to this invention.
Figure 2:
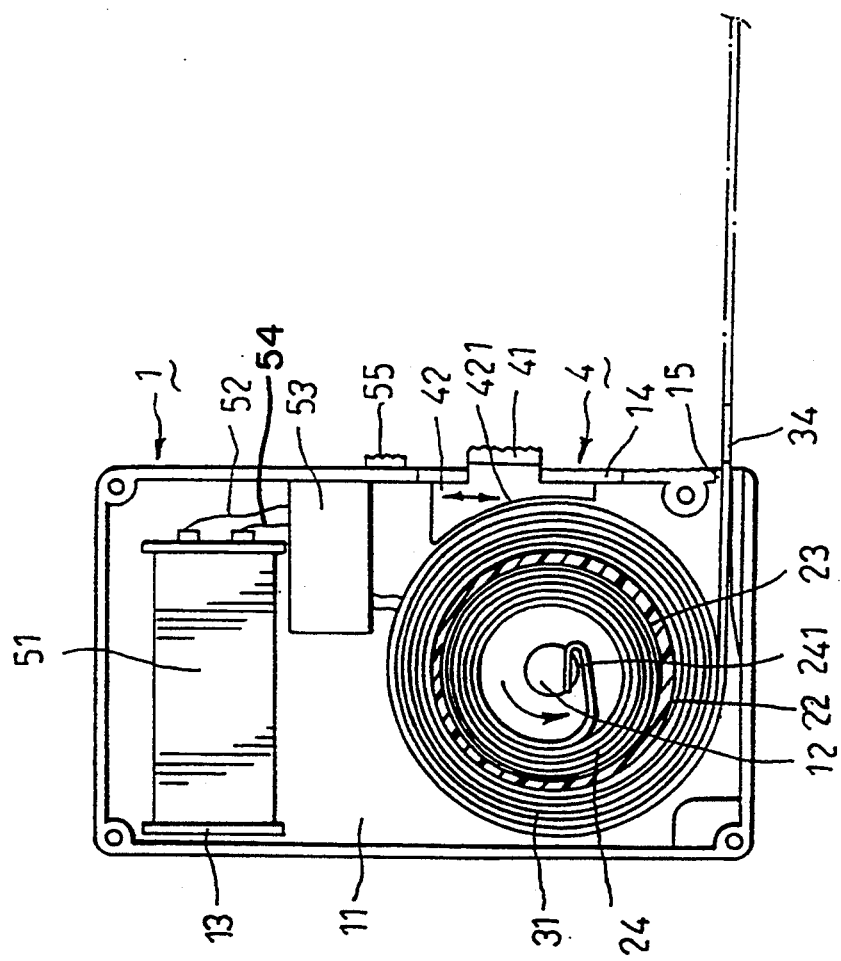
FIG. 2 is a schematic view showing a portable light generating belt device of this invention.

Referring to FIGS. 1 and 2, a portable light generating belt device of this invention includes a housing 1 with an aperture 15 formed through a wall of the housing 1, a shaft 12 fixed in the housing 1 and having an end surface in which a slot 121 is formed, and a retaining unit 16 which is a post fixed on the outer surface of the housing 1. The housing 1 consists of a first half 1A and a second half 1B which is screwed to the first half 1A. A pulley 2 includes a pulley body 21 which is disposed rotatably on the shaft 12 of the housing 1, an annular groove 22 formed in the outer peripheral surface of the pulley body 21, and a cavity 23 formed between side walls of the pulley body. A torsion spring 24 is received within the cavity 23 of the pulley body 21 and is secured at one end portion 241 thereof within the slot 121 of the shaft 12 of the housing 1 and at the other end portion thereof to the pulley body 21. The shaft 12 extends through an opening 211 in the pulley body 21.

A light generating belt 3 is wound on the pulley 2 and has an inner end portion secured to the pulley 2 and an outer end portion which extends through the aperture 15 of the housing 1 and which has an enlarged end 34 that is located outside the housing 1 and that is sized so that the enlarged end 34 of the belt 3 cannot pass through the aperture 15 into the housing 1. The torsion spring 24 biases the pulley 2 to rotate in a direction so as to wind the belt 3 on the pulley 2, and the enlarged end 34 of the belt 3 has a central hole and can be sleeved on the retaining unit 16 of the housing 1 when moved away from the aperture 15 of the housing 1 in a case where the device is in use. The light generating belt 3 is provided with an electroluminescent strip 33 which extends along the length of the belt 3 and which can be powered to generate light, and two lengthwise scale units 32 on two sides of the strip 33.

The light generating belt may be made of various fabric, metal or plastic materials, and can serve as a measuring tape.

A power supply unit 5 includes a battery 51 clamped between two contact plates 13 in the housing 1, a transformer 53 for converting the direct current output of the battery 51 to alternating current and for interconnecting electrically the battery 51 and the strip 33 on the belt 3 by means of electrical wires 52 and 54 thereof, and a switch 55 installed on the housing 1. The switch 55 can be actuated so as to activate the battery 51 to supply electrical current to the strip 33, thus lighting the latter.

A slide slot 14 is formed through the wall of the housing 1 near the aperture 15. A gripping member 4 is disposed slidably in the slide slot 14 and has an actuator portion 41 located outside the housing 1 and a press portion 42 with an arc surface 421. The gripping member 4 can be moved as shown by the arrow in FIG. 2 so that the arc surface 421 of the press portion 42 presses the belt 3 against the pulley 2. At this time, the pulley 2 cannot be rotated in the housing 1.

A retaining clip 17 is mounted detachably on the outer surface of the housing 1 in order to fasten the housing 1 to a user's waist belt.

Figure 3:
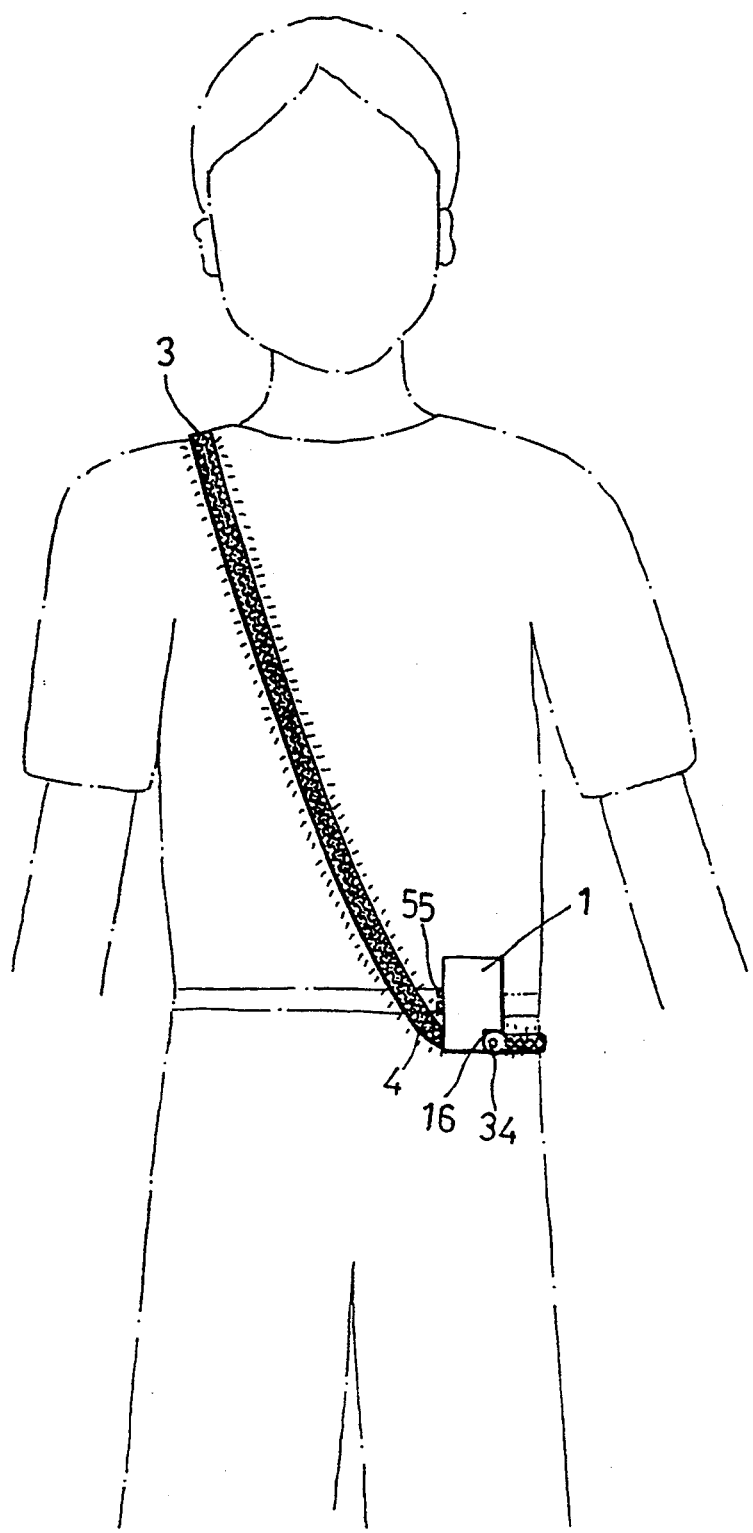
FIG. 3 is a schematic view showing a user carrying a portable light generating belt device of this invention.

Referring to FIG. 3, when the light generating device is in use, in a situation where a portion of the belt 3 is pulled out from the housing 1 and is extended around the shoulder of the user, the enlarged end 34 of the belt 3 can be retained on the retaining unit 16 in such a manner that the remaining portion of the belt 3 is locked in the housing 1 by the gripping member 4.

While the invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A portable light generating belt device comprising:
   a housing including a wall with an aperture formed therethrough, a shaft fixed in said housing, and a retaining unit disposed on an outer surface of said housing;
   a pulley including a pulley body rotatably disposed on said shaft of said housing and having an annular groove formed in an outer surface thereof, and a cavity formed in side walls of said pulley body, and a torsion spring received within said cavity of said pulley body and secured at one end portion thereof to said shaft of said housing and at side walls end portion thereof to said pulley body;
   a light generating belt wound on said pulley and provided with an electroluminescent strip that is capable of being powered to generate light, said light generating belt having an inner end portion secured to said pulley, and an outer end portion extending through said aperture of said housing and having an enlarged end which is located outside said housing and which is sized so that said enlarged end of said belt cannot pass through said aperture into said housing, said spring biasing said pulley body to rotate in a direction so as to wind said belt on said pulley, said enlarged end of said belt being capable of being retained on said retaining unit of said housing when moved away from said aperture of said housing when said device is in use; and
   a battery operated power supply unit mounted in said housing and connected electrically to said strip on said belt, said power supply unit capable of being actuated so as to supply electrical current to said strip, thereby lighting said strip on said belt;
   whereby, by pulling said belt, a portion of said belt is extracted from said housing when in use, and when pull on said belt is released, said portion of said belt can be retracted into said housing except for said enlarged end of said belt.

2. A portable light generating belt device as claimed in claim 1, wherein said strip extends lengthwise along said belt, said light generating belt device having two lengthwise scale units on two sides of said strip so as to permit use of said belt as a measuring tape.

3. A portable light generating belt device as claimed in claim 1, wherein said housing further includes a slide slot formed through the wall thereof near said aperture, and a gripping member disposed slidably in said slide slot and being capable of being actuated to slide toward said aperture along said slide slot so as to press said belt against said pulley, thereby preventing rotation of said pulley in said housing.

4. A portable light generating belt device as claimed in claim 1, further comprising a retaining clip disposed detachably on said outer surface of said housing so as to permit fastening of said housing to a waist belt of a user.

* * * * *